Feb. 27, 1951        G. V. WOODLING        2,543,088
TURNABLE COUPLING MEMBER
Filed Nov. 22, 1947
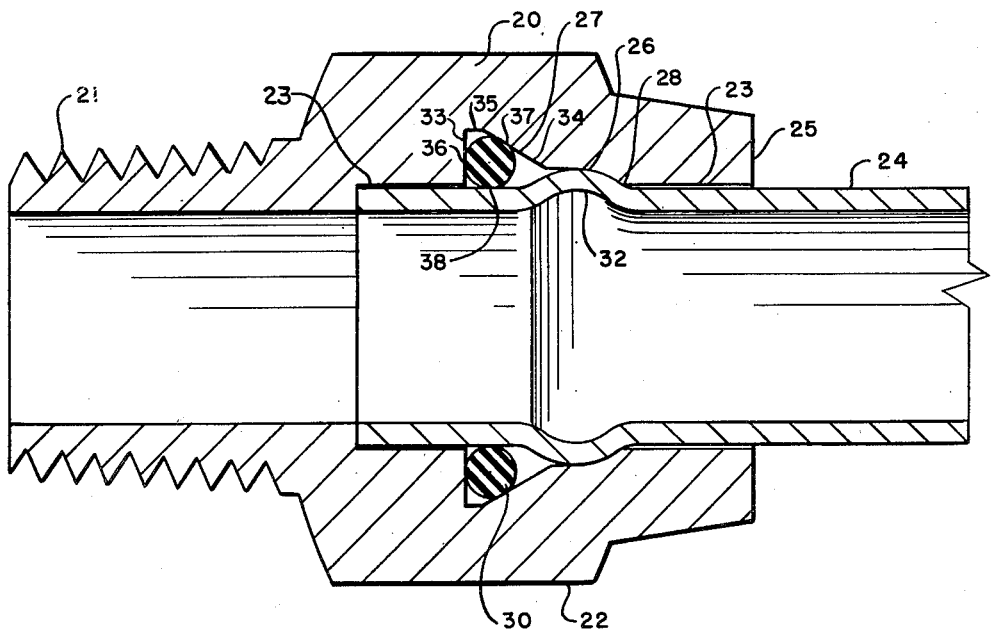
INVENTOR.
George V. Woodling.
BY Patented Feb. 27, 1951

2,543,088

UNITED STATES PATENT OFFICE 2,543,088

TURNABLE COUPLING MEMBER

George V. Woodling, Cleveland, Ohio

Application November 22, 1947, Serial No. 787,568

1 Claim. (Cl. 285—97.8)

1

My invention relates in general to a tube coupling member, and more particularly to a tube coupling member adapted to be turnably and sealingly connected to a tube inserted therein. This invention constitutes an improvement over the inventions shown in my copending applications for Letters Patent Serial Numbers 574,467 and 574,468, filed January 25, 1945, now Patent Nos. 2,438,529 and 2,438,530, granted March 30, 1948.

An object of my invention is the provision of making a turnable connection between a tube and a coupling member whereby the coupling member may be threadably connected to a threaded element without twisting the tube.

Another object of my invention is the provision in a coupling member of an internal groove adapted to receive sealing means, in which the groove has at least a side defining an annular converging surface extending toward a metal-to-metal expansion fit between the coupling member and an expanded section of the tube.

Another object of my invention is to prevent extrusion of the sealing means by providing a metal-to-metal contact between the tube and the coupling member on the side of the sealing means which is subject to extrusion.

Another object of my invention is to provide a minimum of turning resistance between the sealing means and the tube.

Other objects and a fuller understanding of my invention may be had by referring to the following description and claim, taken in conjunction with the single view of the drawing.

With reference to the figure of the coupling drawing, my invention is shown as being applied to a coupling member 20 which is adapted to be connected to a tube 24. The left-hand end portion of the coupling member 20 is provided with threads 21, which are usually in the form of pipe threads, for engaging a cylinder, valve or other threadable element. The right-hand end of the coupling member 20 comprises a nut portion 22 whereby the coupling member may be turned by a suitable wrench or tool. The coupling member is provided with a counterbore 23 into which the end portion of the tube 24 is inserted. The tube may be of any suitable material, and is further characterized as being outwardly extensible whereby a section thereof may be expanded into the coupling member after insertion therein to make an internal expansion fit with the coupling member 20.

Instead of being provided with male threads 21, the coupling member 20 may be provided with female threads for connection to a fitting element, as shown in my copending application Serial No. 574,467, filed January 25, 1945. The coupling shown in the drawing is of a large size. In the trade the couplings may vary in size from a ¼ inch tube to a 1½ or 2 inch tube. The O ring may vary from $\frac{1}{16}$ inch in cross-sectional diameter to ¼ or ⅜ inch in diameter. The right-hand end of the coupling member is provided with an end surface 25, and the counterbore 23 extends longitudinally inwardly of the coupling member from the end surface 25. The counterbore 23 comprises a first portion 26 to receive an expanded section 32 of the tube, and a second portion 27 to receive sealing means 30 which comprises an annular O ring of resilient material of rubber-like nature. The first portion 26 of the counterbore has an arcuate surface against which the expanded section 32 of the tube turnably engages, which provides for relative turning movement between the coupling member and the tube. The expanded section 32 of the tube may be expanded laterally outwardly by any suitable means, and in its expanded position it makes a relatively close engagement with the arcuate surface of the first portion 26 of the counterbore to produce a turnable expansion fit which provides for relative turning movement between the coupling member 20 and the tube 24, so that the coupling member may be threadably connected to a threaded element without twisting the tube. The right-hand or rearward side of the arcuate surface of the first portion 26 extends laterally towards the tube and meets with the counterbore 23 to define an annular juncture 28 which closely surrounds the tube to resist longitudinal pull of the tube from the coupling member.

The first portion 26 and the second portion 27 constitute enlarged internal wall means, the first portion 26 defining an annular arcuate wall surface merging into an internal groove.

The second groove portion 27 which receives the O ring 30 has a first side 33 extending outwardly substantially perpendicular to the tube, and has a second side 34 which constitutes an annular converging surface extending toward the first groove portion 26 into which the expanded section 32 of the tube is expanded. The second groove portion 27 also has a bottom side 35. The relationship between the tube, the first side 33, and the second side 34, is such that the O ring makes contact respectively therewith at the places 36, 37 and 38.

It is to be observed that the contact points 36 and 37 are spaced substantially in the neighborhood of 150° apart, the contacts 37 and 38 approximately 120° apart, and the contacts 38 and 36 approximately 90° apart. Accordingly, the outward stretching of the O ring when the tube is inserted therein is not opposed diametrically by a contact which resists the expansion thereof. In other words, the shape of the second groove portion 27 is such that a wide amount of manufacturing tolerances may be permitted and yet always insure that the O ring will readily yield and give proper operation without gripping the tube too tight and prevent the turning of the tube. Under conditions where the O ring is being expanded when the tube is being pushed in the coupling member, it is to be noted that the O ring, when it is being expanded by insertion of the tube into the coupling member, may slide laterally with reference to the first side wall 33 at the contact 36, and also that the O ring may deform itself between the contacts 36 and 37 and extend toward the bottom of the groove 35. Thus, the construction of the second groove portion 27 is such that for wide amounts of manufacturing tolerances the O ring accommodates itself, so that for minimum tolerances or for maximum tolerances the O ring provides a seal and yet does not offer too much gripping resistance to the turning of the tube within the coupling member.

The initial contact of the O ring at the contact places 36, 37 and 38 is sufficient to give initial seal of the fluid pressure, and with increases of fluid pressure the fluid pressure tends to push the O ring rearwardly toward the expanded section of the tube, with the result that the O ring provides an increasing amount of sealing engagement to withstand the increased fluid pressure. The expanded section 32 of the tube and the first groove portion 26 make a metal-to-metal contact, and thus under extremely high fluid pressures the O ring cannot extrude, since the metal-to-metal contact does not allow any clearance to exist therebetween through which the O ring may extrude. Therefore, my invention provides not only a construction of a groove to receive an O ring having a wide amount of manufacturing tolerances, but also a construction wherein a metal-to-metal contact prevents extrusion of the O ring, as well as permitting the turning of the coupling member without encountering too much gripping resistance from the O ring.

The internal portion of the coupling member which receives the expanded section of the tube and the sealing means may be referred to as enlarged internal wall means.

This application is related to my four copending applications for Letters Patent filed concurrently herewith entitled "Turnable Coupling Member," each application being identified as follows: Serial No. 787,566, filed November 22, 1947; Serial No. 787,567, filed November 22, 1947, now Patent No. 2,477,676; Serial No. 787,690, now abandoned, filed November 24, 1947, and Serial No. 787,567, filed November 22, 1947, now Patent No. 2,477,677.

Although my invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A tube coupling member disposed to be turnably and sealingly connected to a tube inserted therein, said coupling member having a counterbore extending longitudinally inwardly from an end thereof, said counterbore having an annular wall to closely receive the tube and enlarged internal wall means to receive an expanded section of the tube and sealing means, said enlarged internal wall means defining an annular arcuate wall surface merging into an internal groove, said internal groove having at least first and second sides, said first side extending generally radially outwardly from said annular wall and said second side defining an annular converging surface having its smaller end meeting with the annular arcuate wall surface, said first and second sides of the groove and said tube being engageable by the sealing means for effecting a sealing engagement between the coupling member and the tube, said sealing means being forced into the angle of the groove by insertion of the tube into the coupling and forced inwardly along the converging surface into sealing engagement with the tube by pressure of fluid in the tube.

GEORGE V. WOODLING.

REFERENCES CITED

The following references are of record in the file of this patent:

UNITED STATES PATENTS

| Number | Name | Date |
|---|---|---|
| 1,995,006 | Mueller et al. | Mar. 19, 1935 |
| 2,346,051 | Seamark | Apr. 4, 1944 |
| 2,438,530 | Woodling | Mar. 30, 1948 |